United States Patent [19]
Knupfer et al.

[11] 3,890,364
[45] June 17, 1975

[54] α-ARYL-B-(AMINO-PHENYL)ACRYLONITRILES WITH AN O-DIALKYL SULPHAMIDOXY OR SULFURIC ACID SEMI-ESTER GROUP

[75] Inventors: Hans Knupfer, Berg, Neukirchen; Carl-Wolfgang Schellhammer, Opladen, both of Germany

[73] Assignee: Bayer Aktiengesellschaft, Leverkusen-Bayerwerk, Germany

[22] Filed: Dec. 11, 1972

[21] Appl. No.: 313,676

Related U.S. Application Data
[63] Continuation of Ser. No. 849,867, Aug. 13, 1969, abandoned.

[30] Foreign Application Priority Data
Aug. 23, 1968 Germany.............................. 1793261

[52] U.S. Cl.... 260/456 A; 260/240 D; 260/343.2 R; 260/465 D; 260/465 E
[51] Int. Cl................... C07c 121/00; C07c 137/00
[58] Field of Search......... 260/465 E, 465 D, 465 A

[56] References Cited
UNITED STATES PATENTS
3,514,471  5/1970  Yanagisawa et al............ 260/465 X

*Primary Examiner*—Lewis Gotts
*Assistant Examiner*—Dolph H. Torrence
*Attorney, Agent, or Firm*—Plumley & Tyner

[57] ABSTRACT
β-Phenyl-acrylic acid nitriles of the general formula

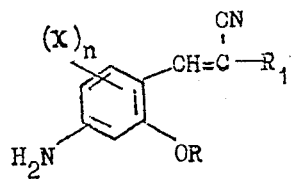

in which X stands for a substituent; $n$ denotes the numbers 0 to 3; $R_1$ stands for an optionally substituted phenyl or naphthyl group, for an aromatic-heterocyclic radical which is linked via a carbon atom to the α-carbon atom of the β-phenyl-acrylonitrile radical, or for a carboxyl group; and R stands for an alkyl group, for a radical

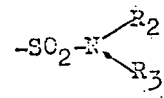

where $R_2$ and $R_3$ denote an alkyl radical, for a radical $-S_{03}Z$ where Z denotes H or a metal atom, or for a radical $-CH_2OR_4$ where $R_4$ denotes an alkyl, aralkyl or aryl radical, and a process for their production characterised by treating toluene derivatives of the formula

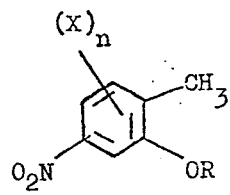

wherein X, n and R have the meanings given above in an aqueous alkaline medium at temperatures of about 50° to 120°C with an alkali metal polysulphide and subsequently without intermediate isolation with nitriles of the formula

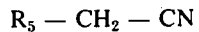

wherein $R_5$ stands for an optionally substituted phenyl or naphthyl group, for an aromatic-heterocyclic radical which is linked via a carbon atom to the group $CH_2$, for a carboxyl, carboxamide or carboxylic ester group.

These compounds are used as intermediates in the formation of coumarin brightening agents.

4 Claims, No Drawings

α-ARYL-B-(AMINO-PHENYL)ACRYLONITRILES WITH AN O-DIALKYL SULPHAMIDOXY OR SULFURIC ACID SEMI-ESTER GROUP

This is a Continuation, of application, Ser. No. 849,867 filed Aug. 13, 1969 now abandoned.

The subject-mattter of the present invention comprises β-phenyl-acrylic acid nitriles of the general formula

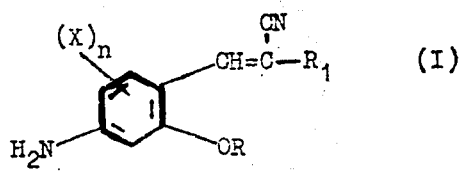
(I)

in which X stands for a substituent, preferably an alkyl group with 1 to 4 carbon atoms; $n$ denotes the numbers 0 to 3; $R_1$ denotes an optionally substituted phenyl or naphthyl group, an aromatic-heterocyclic radical which is linked to the α-carbon atom of the β-phenyl-acrylonitrile radical via a carbon atom, or denotes a carboxyl group; and R stands for an alkyl group, preferably with 1 to 4 carbon atoms, for a radical

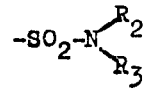

where $R_2$ and $R_3$ denote an alkyl radical, for a radical $-SO_3Z$ where Z denotes H or a metal atom, preferably an alkali metal atom such as Na or K, or for a radical $-CH_2OR_4$ where $R_4$ denotes an alkyl, aralkyl or aryl radical, as well as a process for their production.

The following compounds of the general formula (I) are mentioned by way of example; the numbers in brackets indicate the position of the substituents in the aryl radicals or heterocyclic radicals;

Compounds of the formula (I)

| R | X | $R_1$ |
|---|---|---|
| $-CH_3$ | H | –phenyl |
| $-C_2H_5$ | H | –phenyl |
| $-CH_3$ | H | –phenyl–Cl |
| $-CH_3$ | H | –thienyl |
| $-CH_3$ | $-CH_3(6)$ | –phenyl |
| $-CH_3$ | H | –benzoxazolyl |
| $-CH_3$ | H | $-CO_2H$ |
| $-C_4H_9$ | H | –phenyl–Cl |
| $-SO_2N(CH_3)_2$ | H | –phenyl |
| $-SO_2N(CH_3)_2$ | H | –phenyl–$CH_3$ |
| $-SO_2N(CH_3)_2$ | H | –phenyl–$OCH_3$ |
| $-SO_2N(CH_3)_2$ | H | –phenyl($CH_3$)$_2$ |
| $-SO_2N(CH_3)_2$ | H | –phenyl(Cl)($CH_3$) |
| $-SO_2N(CH_3)_2$ | H | –phenyl(Cl)$_2$ |
| $-SO_2N(CH_3)_2$ | H | –phenyl(Cl)$_3$ |

-Continued

| R | X | $R_1$ |
|---|---|---|
| $-SO_2N(CH_3)_2$ | H | 2-naphthyl |
| $-SO_2N(CH_3)_2$ | H | 1-naphthyl |
| $-SO_2N(CH_3)_2$ | H | thienyl |
| $-SO_2N(CH_3)_2$ | H | pyridyl |
| $-SO_2N(CH_3)_2$ | H | indolyl |
| $-SO_2N(CH_3)_2$ | H | $-CO_2H$ |
| $-SO_2N(C_2H_5)_2$ | H | phenyl |
| $-SO_2N\langle H \rangle$ | H | phenyl |
| $-SO_2N(CH_3)_2$ | $-CH_3(6)$ | phenyl |
| $-SO_3Na$ | H | phenyl |
| $-OCH_2OCH_3$ | H | phenyl |

The process according to the invention consists in that toluene derivatives of the general formula $$\text{(II)}$$

(with structure: $O_2N$-substituted benzene ring with $(X)_n$, $CH_3$, and $OR$ substituents)

in which X, n and R have the same meaning as above, are first treated in an aqueous-alkaline medium, preferably in the presence of organic solvents, at temperatures of about 50 to 120°C with an alkali metal polysulphide, and the product is subsequently reacted, without intermediate isolation, preferably at temperatures of 20° to 120°C, with nitriles of the formula $$R_5 - CH_2 - CN \quad \text{(III)}$$

in which $R_5$ denotes an optionally substituted phenyl or naphthyl group, an aromatic-heterocyclic radical which is linked via a carbon atom to the group $CH_2$, a carboxyl, carboxamide or carboxylic ester group, and that the reaction products are subsequently isolated in the usual way, for example, by cooling, possibly acidification, and filtering off with suction. The carboxamide or carboxylic ester groups are converted into carboxylic acid groups.

The process according to the invention is generally carried out by mixing a solution of the toluene derivative (II) in an organic water-miscible solvent, for example, an alcohol or dimethyl sulphoxide, at temperatures of about 50° to 120°C with at least the amount of an aqueous-alkaline polysulphide solution required for reduction of the nitro group or oxidation of the methyl group, heating at 50° to 120°C for about ½ to 3 hours, subsequently adding, possibly after cooling, about 0.7 to 1 mol of the nitrile (III), heating for a prolonged time, if desired, and subsequently isolating the reaction product in the usual way.

Suitable toluene derivatives of the formula (II), are, for example; 2-methoxy-4-nitro-toluene, 2-ethoxy-4-nitro-toluene, 2-n-butoxy-4-nitro-toluene, 2-methoxy-4-nitro-6-methyl-toluene, N,N-dimethylsulfamic acid-(2-methyl-5-nitro-phenyl) ester, (2-N,N-dimethylsulfamidoxy-4-nitro-toluene), N,N-dimethylsulfamic acid-(2,4-dimethyl-5-nitro-phenyl) ester, Na- or K-salt of the sulphuric acid-(2-methyl-5-nitro-phenyl)-semi esters, 2-(methoxymethoxy)-4-nitro-toluene.

Suitable nitriles of the general formula (III) are, for example: phenyl-acetonitrile, p-tolyl-acetonitrile, m-tolyl-acetonitrile, (3,5-dimethyl-phenyl)-acetonitrile, (4-chloro-phenyl)-acetonitrile, (3,4-dichlorophenyl)-acetonitrile, (4-methyl-sulphonyl-phenyl)-acetonitrile, (4-methoxy-phenyl)-acetonitrile, naphthyl-1-acetonitrile, naphthyl-2-acetonitrile, thienyl-2-acetonitrile, pyridine-2-acetonitrile, pyridine-3-acetonitrile, pyridine-4-acetonitrile, cyanoacetic acid and cyanoacetic acid ethyl ester.

Suitable solvents for the preparation of the aqueous-organic medium are, in particular, lower alcohols, for example, methanol, ethanol and propanol, and dimethyl sulphoxide.

The term alkyl-polysulphides refers to polysulphides which can be obtained by dissolving sulphur in an aqueous alkali metal hydroxide and/or alkali metal sulphide; the preferred alkali metal compounds are the sodium or potassium compounds.

It was known from J. Chem. Soc. 1927, page 1741, to prepare 2-alkoxy-4-acylamino-benzaldehydes from 2-alkoxy-4-nitro-toluenes by reduction with an alkaline polysulphide solution and subsequent acylation. It was also known from Swiss Patent Specification No. 341,834 to react 2-alkoxy-4-acylamino-benzaldehydes with substituted acetonitriles to form β-(acylamino-alkoxyphenyl)-acrylic acid nitriles. It is there stated that the presence of a free amino group in the alkoxy-benzaldehyde gives rise to interfering side reactions. In view of the aforesaid state of the art it was new and completely surprising that the two reactions, i.e. the aldehyde formation and the condensation to form the β-phenyl-acrylic acid nitrile can be carried out in a single-pot reaction, even if starting compounds are used which intermediarily yield 4-amino-2-alkoxy-benzaldehydes, and that β-phenyl-acrylic acid nitriles can be obtained by the process according to the invention in a high yield, with a high degree of purity and in a simple way while avoiding an acylation reaction.

The compounds of the formula (I) are valuable intermediates for the production of optical brightening agents, as they can easily be converted into the corresponding coumarins of the formula

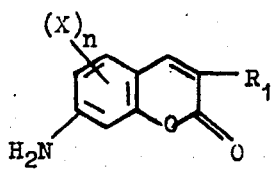

by reaction with acids, for example, by heating with at least 2 mol of a mineral acid at about 80° – 200°C.

Coumarins of this type and the use thereof as brightening agents and for the production of brightening agents are known, for example, from U.S. Pat. Nos. 2,884,286; 2,929,822; 2,945,033; 2,242,177; and Belgian Pat. Specification No. 660,602.

The parts given in the Examples are parts by weight, the temperatures refer to degrees Centigrade.

EXAMPLE 1

A solution of 24 parts $Na_2S . 9 H_2O$, 19 parts sodium hydroxide and 10 parts sulphur in 100 parts of water is added dropwise to a boiling solution of 46 parts 2-methoxy-4-nitro-toluene in 160 parts ethanol and 100 parts of water. The mixture is boiled for 1½ hours, 28 parts benzyl cyanide are added, boiling is continued for one hour, and the product is filtered off with suction when the mixture has cooled to 20°. 25 Parts α-phenyl-β-(2-methoxy-4-aminophenyl)-acrylonitrile of m.p. 140° to 141° are obtained, If the 28 parts benzyl cyanide are replaced with 30 parts 4-chloro-benzyl cyanide, then 36 parts α-(4-chlorophenyl)-β-(2-methoxy-4-aminophenyl)-acrylonitrile of m.p. 228° to 229° are obtained; the use of 18 parts thienyl-2-acetonitrile leads to 26 parts α-(thienyl-2)-β-(2-methoxy-4-aminophenyl)-acrylonitrile of m.p. 168° to 169°.

EXAMPLE 2

A solution of 24 parts $Na_2S . 9 H_2O$, 19 parts NaOH and 10 parts sulphur in 100 parts of water is added dropwise at boiling temperature to a solution of 54.5 parts (2-methyl-5-nitro-phenoxy)-dimethyl ether (prepared from 2-hydroxy-4-nitro-toluene and chlorodimethyl ether) in 158 parts ethanol and 100 parts of water. The mixture is boiled for 1½ hours, 28 parts benzyl cyanide are added, boiling is continued for 60 minutes, and the mixture is allowed to cool to 20°. After filtering off with suction and washing with 50% ethanol, there are obtained 21 parts α-phenyl-β-[2-(methoxy-methoxy)-4-amino-phenyl]-acrylonitrile of m.p. 85.5° to 86°.

EXAMPLE 3

A solution of 13.2 parts $Na_2S . 3 H_2O$, 19 parts NaOH and 10 parts sulphur in 100 parts of water is added dropwise within 10 to 20 minutes to a boiling solution of 72 parts N,N-dimethyl-sulphamic acid-(2-methyl-5-nitro-phenyl) ester (prepared from 2-hydroxy-4-nitro-toluene and N,N-dimethyl-sulphamic acid chloride) in 158 parts ethanol and 100 parts of water. The mixture is boiled for 1½ hours, 28 parts benzyl cyanide are then added, and boiling is continued for a further 30 minutes. The mixture is then cooled to 40°. After filtering off with suction and washing with 50% ethanol, there are obtained 59.5 parts α-phenyl-β-(2N,N-dimethyl-sulphamidoxy-4-amino-phenyl)-acrylonitrile of m.p. 153° to 154°.

If the benzyl cyanide is replaced with corresponding amounts of the following substituted acetonitriles, then the substituted acrylonitriles mentioned below are obtained in similar yields:

p-tolyl-acetonitrile yields α-(p-tolyl)-3-(2-N,N-dimethyl-sulphamidoxy-4-amino-phenyl)-acrylonitrile of m.p. 181° to 182°;
4-methoxybenzyl-cyanide yields α-(4-methoxyphenyl)-β-(2-N,N-dimethylsulphamidoxy-4-amino-phenyl)-acrylonitrile of m.p. 169° to 171°;
4-chlorobenzylcyanide yields α-(4-chlorophenyl)-β-(2-N,N-dimethyl-sulphamidoxy-4-amino-phenyl)-acrylonitrile of m.p. 198° to 199°;
3,4-dichlorobenzyl cyanide yields α-(3,4-dichlorophenyl)-β-(2-N,N-dimethylsulphamidoxy-4-amino-phenyl)-acrylonitrile of m.p. 195° to 196$^b$;
naphthyl-1-acetonitrile yields α-(naphthyl-1)-β-(2-N,N-dimethyl-sulphamidoxy-4-aminophenyl)-acrylonitrile of m.p. 154° to 156°;
napthyl-2-acetonitrile yields α-(naphthyl-2)-β-(2N,N-dimethyl-sulphamidoxy-4-aminophenyl)-acrylonitrile of m.p. 190° to 192°;
thienyl-2-acetonitrile yields α-(thienyl-2)-β-(2-N,N-dimethyl-sulphamidoxy-4-aminophenyl)-acrylonitrile of m.p. 207° to 208°;
pyridine-2-acetonitrile yields α-(pyridyl-2)-β-(2N,N-dimethyl-sulphamidoxy-4-aminophenyl)-acrylonitrile of m.p. 168° to 169°.

EXAMPLE 4

A solution of 72 parts N,N-dimethyl-sulphamic acid-(2-methyl-5-nitro-phenyl) ester in 158 parts ethanol and 100 parts of water is mixed at boiling temperature with a solution of 24 parts $Na_2S . 9 H_2O$, 19 parts NaOH and 10 parts sulphur in 100 parts of water. The mixture is boiled for 1½hours, 26 parts cyanoacetic acid ethyl ester are added, and boiling is continued for 30 minutes. After cooling, the mixture is adjusted to pH 5 to 6 with acetic acid. After filtering off with suction, there are obtained 35 parts α-carbohydroxy-β-(2-N,N-dimethyl-sulphamidoxy-4-amino-phenyl)-acrylonitrile of m.p. 234° to 235° (decomp.).

EXAMPLE 5

A solution of 2-N,N-dimethyl-sulphamidoxy-4-amino-benzaldehyde prepared as in Example 4 is admixed at boiling temperature with a solution of 38 parts benzimidazolyl-2-acetonitrile in 100 parts of a 10% sodium hydroxide solution, the mixture is boiled for 1 hour, and $CO_2$ is introduced at boiling temperature until the product is completely precipitated. After cooling and filtering off with suction, there are obtained 45 parts α-(benzimidazolyl-2)-β-(2-N,N-dimethyl-sulphamidoxy-4-amino-phenyl)-acrylonitrile of m.p. 231° to 233°.

EXAMPLE 6

A solution of 24 parts $Na_2S$ . 9 $H_2O$, 27 parts NaOH and 10 parts sulphur in 100 parts of water is added dropwise to a boiling solution of 76 parts 2-N,N-dimethyl-sulphamidoxy-4-nitro-1,5-dimethyl-benzene in 158 parts ethanol and 100 parts of water. The mixture is boiled for 1½ hours, 28 parts benzyl cyanide are then added, and boiling is continued for one-half hour. After cooling to 30° and filtering off with suction, there are obtained 34.5 parts α-phenyl-β-(2-N,N-dimethyl-sulphamidoxy-4-amino-5-methyl-phenyl)-acrylonitrile of m.p. 143° to 144°.

EXAMPLE 7

A solution of 24 parts $Na_2S$ . 9 $H_2O$, 19 parts NaOH and 10 parts sulphur in 100 parts of water is poured within 15 to 20 minutes into a boiling solution of 70.5 parts of the sodium salt of sulphuric acid-(2-methyl-5-nitro-phenyl) semiester in 158 parts ethanol and 100 parts of water. The mixture is boiled for 1½ hours, 28 parts benzyl cyanide are added, and boiling is continued for another hour. After cooling, the mixture is acidified with dilute sulphuric acid. The residue is dissolved in a 10% sodium carbonate solution, the solution is clarified with active charcoal and then reacidified with dilute sulphuric acid. There are thus obtained 25 parts of a yellow, non-melting product which, according to spectral findings, has the structure of α-phenyl-β-(2-hydrogensulphato-4-amino-phenyl)-acrylonitrile.

We claim:

1. β-phenyl-acrylic acid nitrile or the formula

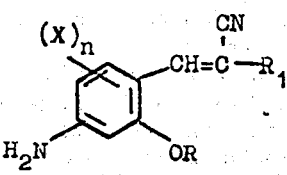

in which X is H or alkyl or 1–4 carbon atoms;
n is a number of 0 to 3;
$R_1$ is phenyl; naphthyl; carboxyl; or phenyl substituted with chloro, methyl, methoxy or methyl sulfonyl;

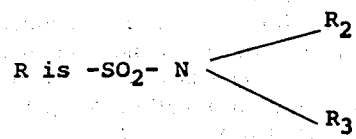

or
—$SO_3Z$;
$R_2$ and $R_3$ are methyl or ethyl; and
Z is H, Na or K.

2. The β-phenyl-acrylic acid nitrile of claim 1 in which

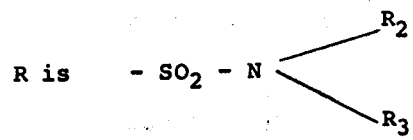

3. The β-phenyl-acrylic acid nitrile of claim 1 in which R is —$SO_3Z$.

4. β-phenyl-acrylic acid nitrile of claim 1 having the formula

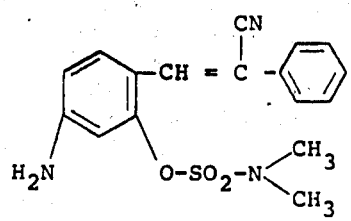

* * * * *